United States Patent [19]

Kargilis et al.

[11] Patent Number: 5,570,931
[45] Date of Patent: Nov. 5, 1996

[54] VEHICLE ADJUSTABLE AND STOWABLE REAR SEAT

[75] Inventors: Elizabeth M. Kargilis, Birmingham; James P. Salva, Shelby Township; Joseph M. Geraci, Lake Orion; Carl Mather, Troy; Robert J. Janosko, Bloomfield Hills, all of Mich.

[73] Assignee: Chrysler Corporation, Highland Park, Mich.

[21] Appl. No.: 536,546

[22] Filed: Sep. 29, 1995

[51] Int. Cl.$^6$ ............................... B60N 2/08; B60N 2/12; B60N 2/24; B60N 2/36
[52] U.S. Cl. ........................... 297/378.12; 297/378.1; 297/341; 297/344.1; 297/344.14; 296/65.1; 296/66; 296/69; 248/429
[58] Field of Search ..................... 297/378.12, 378.1, 297/344.1, 341, 344.14; 248/429, 420; 296/65.1, 66, 69

[56] References Cited

U.S. PATENT DOCUMENTS

| | | |
|---|---|---|
| 2,620,020 | 12/1952 | Austin . |
| 3,140,114 | 7/1964 | Stephenson et al. . |
| 3,202,453 | 8/1965 | Richards . |
| 3,669,488 | 6/1972 | Derrickson, Jr. et al. ............... 296/66 |
| 3,957,312 | 5/1976 | Bonnaud ..................... 297/378.12 X |
| 4,046,349 | 9/1977 | MacAfee . |
| 4,152,024 | 5/1979 | Farelli . |
| 4,206,946 | 6/1980 | Maertens ............................ 296/66 X |
| 4,286,819 | 9/1981 | Inoue ................................ 296/65.1 |
| 4,368,916 | 1/1983 | Blasin .................................. 297/341 |
| 4,390,205 | 6/1983 | Louis ................................ 296/66 X |
| 4,484,776 | 11/1984 | Gokimoto et al. ................. 296/65.1 |
| 4,699,418 | 10/1987 | Plavetich ............................ 296/65 X |
| 4,805,953 | 2/1989 | Yamauchi . |
| 4,932,706 | 6/1990 | Wainwright et al. . |
| 4,957,321 | 9/1990 | Martin et al. . |
| 4,979,773 | 12/1990 | Eubank ................................ 296/65.1 |
| 4,986,591 | 1/1991 | Martienssen et al. ............... 296/65.1 |
| 5,195,795 | 3/1993 | Cannera et al. . |
| 5,328,238 | 7/1994 | Yamakazi ........................ 297/378.1 X |
| 5,482,349 | 1/1996 | Richter et al. .................. 297/378.12 X |

FOREIGN PATENT DOCUMENTS

| | | | |
|---|---|---|---|
| 1452002 | 8/1966 | France .................................. 296/65.1 |
| 628078 | 8/1949 | United Kingdom ..................... 296/66 |

Primary Examiner—Peter M. Cuomo
Assistant Examiner—Rodney B. White
Attorney, Agent, or Firm—Thomas G. Pasternak

[57] ABSTRACT

A longitudinally adjustable vehicle seat, including a seat cushion and a seatback, is supported on a bi-level seat frame for movement from an occupant in-use position to a compact fold-flat stowed position. The bi-level seat frame includes a front lower portion slidably supported on front track assemblies and a rear elevated portion slidably supported on rear track assemblies. A pair of forward upright links each has a lower end pivoted on the seat frame front portion for rotation about a first transverse axis and upper ends pivoted to associated front underlying portions of the seat cushion for rotation about a second transverse axis. A pair of upstanding laterally spaced arms each has a lower end fixed to an aft end of the seat cushion and an upper end pivoted to an intermediate portion of the seatback for rotation about a third transverse axis. The seatback has its lower portion pivoted to a pair of pivot mounts on the seat frame elevated portion for rotation about a fourth transverse pivot axis. Upon the seatback being unlatched and pivoted forwardly about the pivot mounts, the seat cushion undergoes conjoint parallelogram movement, about the four pivot axes to a stowed position adjacent the floor of the vehicle, wherein the seatback is stowed in an overlying manner relative to the seat cushion. The rear surface of the stowed seatback is disposed flush with the surface of the vehicle elevated rear cargo load floor.

13 Claims, 7 Drawing Sheets

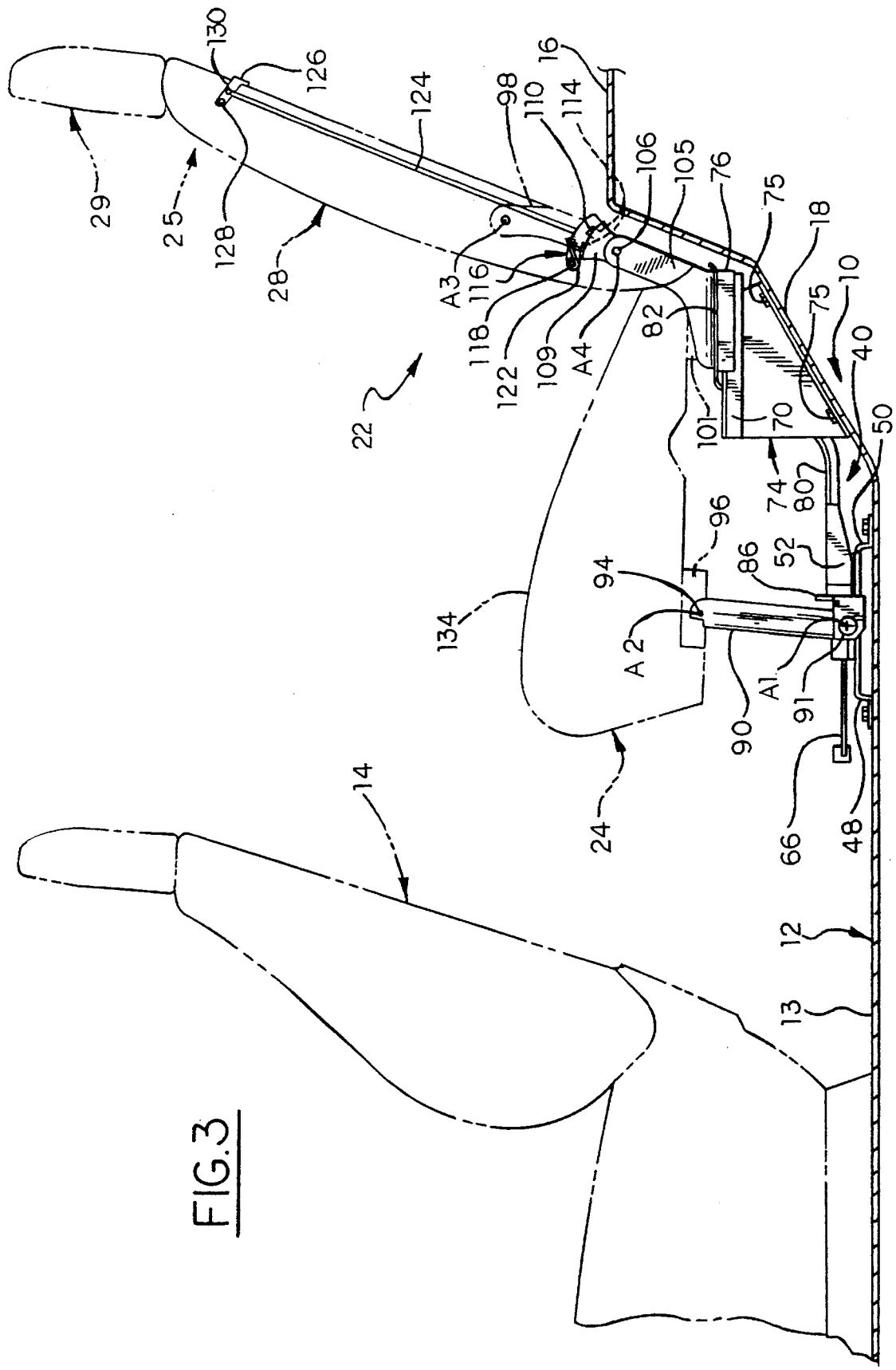

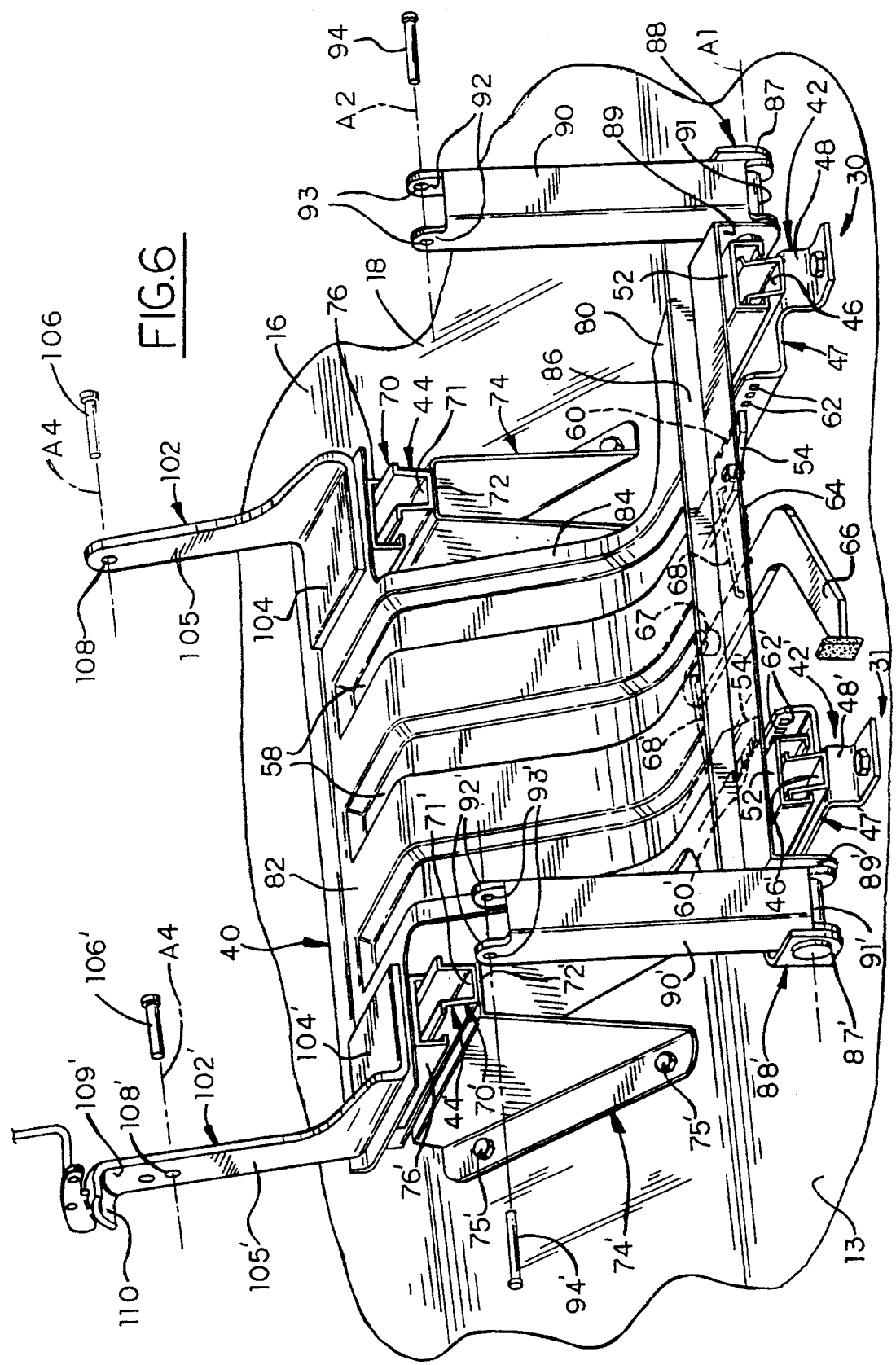

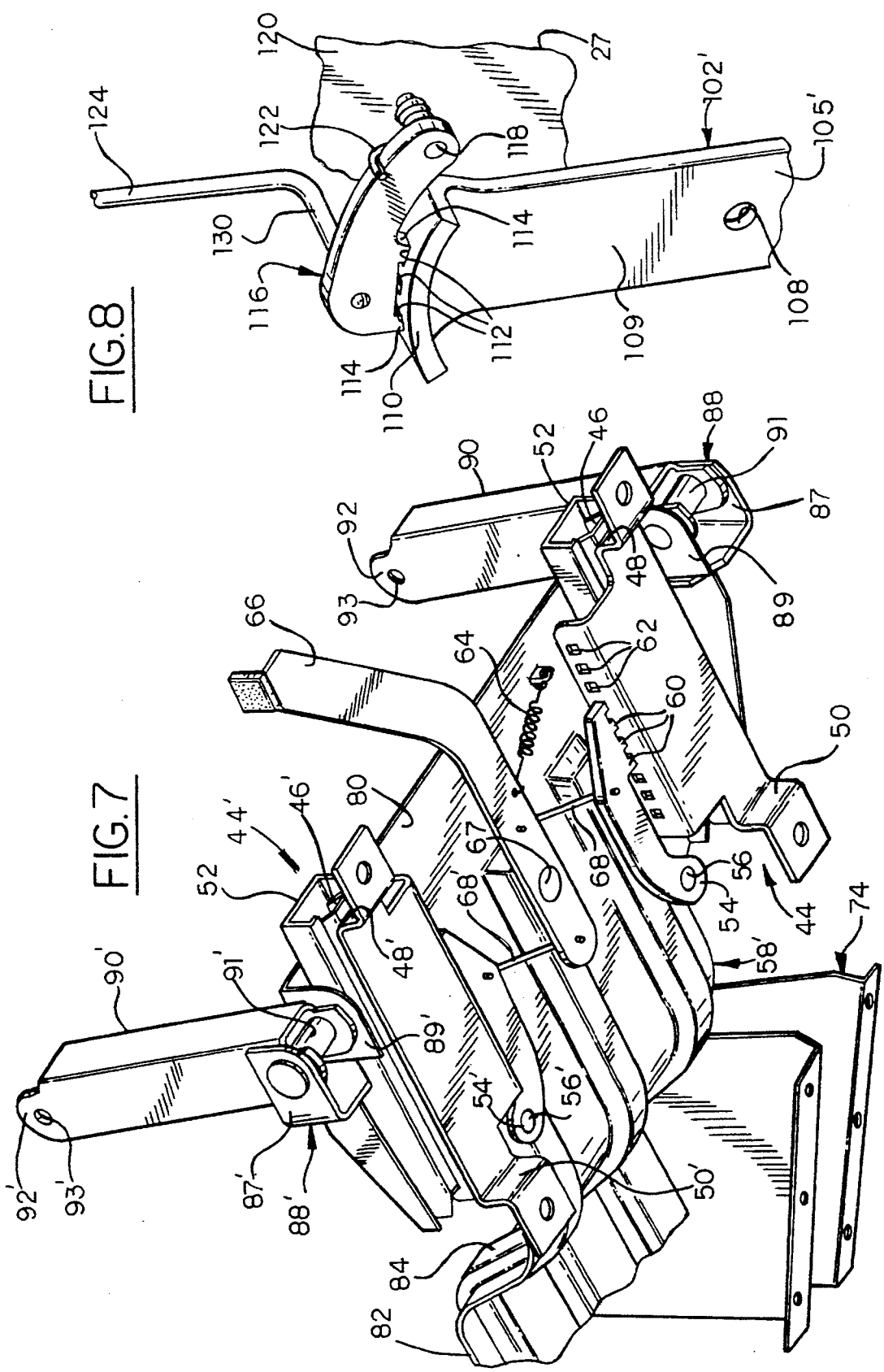

VEHICLE ADJUSTABLE AND STOWABLE REAR SEAT

FIELD OF THE INVENTION

This invention relates to vehicle seats, and more particularly, to vehicle adjustable rear seats adapted for conversion between an in-use seating position and a forwardly folded stowed position.

BACKGROUND OF THE INVENTION

In various types of motor vehicles, including utility or van type vehicles, it is common practice to provide rear passenger seats that allow for conversion from an in-use seating mode to a stowed mode. An example is U.S. Pat. No. 4,191,417, issued Mar. 4, 1980 to Ferrara, which discloses a vehicle seat adapted to be converted from an in-use position to a folded stowed configuration. The Ferrara seat includes an upright seatback, adapted pivotable movement about its lower edge, providing a cargo floor extension over the area occupied by the seat cushion.

U.S. Pat. No. 4,957,321, issued Sep. 18, 1990 to Martin et al., discloses a stowable vehicle seat with a seatback position controller. The Martin seat cushion moves from an elevated horizontal seating position to a stowed position adjacent the vehicle floor only upon movement of the seatback from an upright use position to a generally horizontal folded position. A parallel link arrangement is disclosed between the vehicle and the seat cushion providing a control linkage for shifting the link arrangement from a locked to a free position in response to movement of the seatback.

SUMMARY OF THE INVENTION

It is a feature of the present invention to provide a vehicle seat which allows forward and aft seat adjustment, with a minimum of effort, together with ready conversion to a compact fold-flat stowed configuration.

It is a further feature of the present invention to provide a vehicle rear seat adapted for passenger seating and cargo storage functionality which is easy to operate by means of a single operating lever readily accessible from the front of the seat.

It is another feature of the present invention to provide a vehicle rear seat for use with a split rear bench seat arrangement that is inexpensive to produce and which allows either split seat to be longitudinally adjusted or converted into a fold-flat stowage mode wherein the rear surface of the stowed split seatback is flush with an elevated rear cargo load floor of the vehicle.

It is yet another feature of the present invention to provide a vehicle rear seat that is convertible from an in-use mode to a fold-flat storage mode, wherein a headrest of the stowed horizontally disposed seatback is adapted to contact a forward portion of the underlying stowed seat cushion while the folded seatback front surface is maintained in vertically spaced relation to the opposed seat cushion upper surface.

It is still another feature of the present invention to provide a vehicle rear seat as set forth above wherein the seat cushion and seatback are supported on a bi-level seat frame such that a lower front portion of the seat frame is slidably mounted on front track assemblies while an elevated rear portion of the seat frame is slidably mounted on elevated rear track assemblies mounted on the body at a predetermined vertical dimension above the front track assemblies.

A still further feature of the present invention is to provide a vehicle rear seat wherein a pair of forward upright links each have a lower end pivotally mounted on an upper carriage track of associated front track assemblies, for rotation about a first transverse axis, and an upper end pivoted for rotation about a second transverse axis with respect to an underlying forward portion of the seat cushion. A pair of upstanding, laterally spaced, seat cushion arms each has a proximate end fixed to an aft end of the seat cushion and a distal free end pivoted to an intermediate portion of the seatback for rotation of the seatback about a third transverse axis. A pair of laterally spaced upstanding seatback side members, fixed on the seat frame rear elevated portion, each having an upper end pivoted to a lower portion of the seatback for rotation about a fourth transverse axis, wherein the third and fourth axes define a common plane that includes the seatback.

A first latching device is adapted for locking the seat frame in a plurality of longitudinal adjustment positions while a second latching device is adapted for locking the seatback in a plurality of inclined positions. Upon an operator locking the first latching device in a predetermined forward setting and unlocking the second latching device, the seatback is adapted to be tilted forward about the fourth axis toward the seat cushion. The pivotal movement of the seatback results in conjoint parallelogram movement of the seat cushion about the first, second, third, and fourth transverse axes from its in-use position to a forwardly and downwardly stowed position, wherein the seatback overlies the seat cushion in a spaced horizontal manner with the seatback headrest contacting a forward portion the seat cushion.

The seat is particularly adapted for use in a sport utility or van type vehicle wherein the vehicle floor has a forward generally flat portion, upon which the forward track assemblies are supported, and an aft elevated cargo load floor. The elevated rear track assemblies are supported at an intermediate elevated position a predetermined vertical dimension below the surface of the cargo load floor, enabling the stowed seatback rear surface to be supported in flush juxtaposed relation with the cargo load floor surface.

In the disclosed embodiment of the invention, about a rear one-third portion of the stowed seatback extends rearwardly beyond the aft end of the underlying stowed seat cushion, such that about a rear one-third portion of the seatback overlies the elevated rear portion of the bi-level seat frame resulting in a compact packaging arrangement of the rear seat in its fold-flat mode.

These and other features and advantages of the invention will be more fully understood from the following detailed description of the invention taken together with the accompanying drawings.

BRIEF DESCRIPTION OF THE DRAWINGS

In the drawings:

FIG. 3 is a view similar to FIG. 2 showing the rear seat adjusted to its full rearward location;

FIG. 6 is a fragmentary perspective view of one split seat frame structure with the seat cushion and seatback removed;

FIG. 7 is a fragmentary perspective view of the underside of the split seat frame structure of FIG. 6; and FIG. 8 is a fragmentary perspective view of the latching mechanism for the reclining seatback of the present invention.

DETAILED DESCRIPTION OF THE INVENTION

Figure 1:
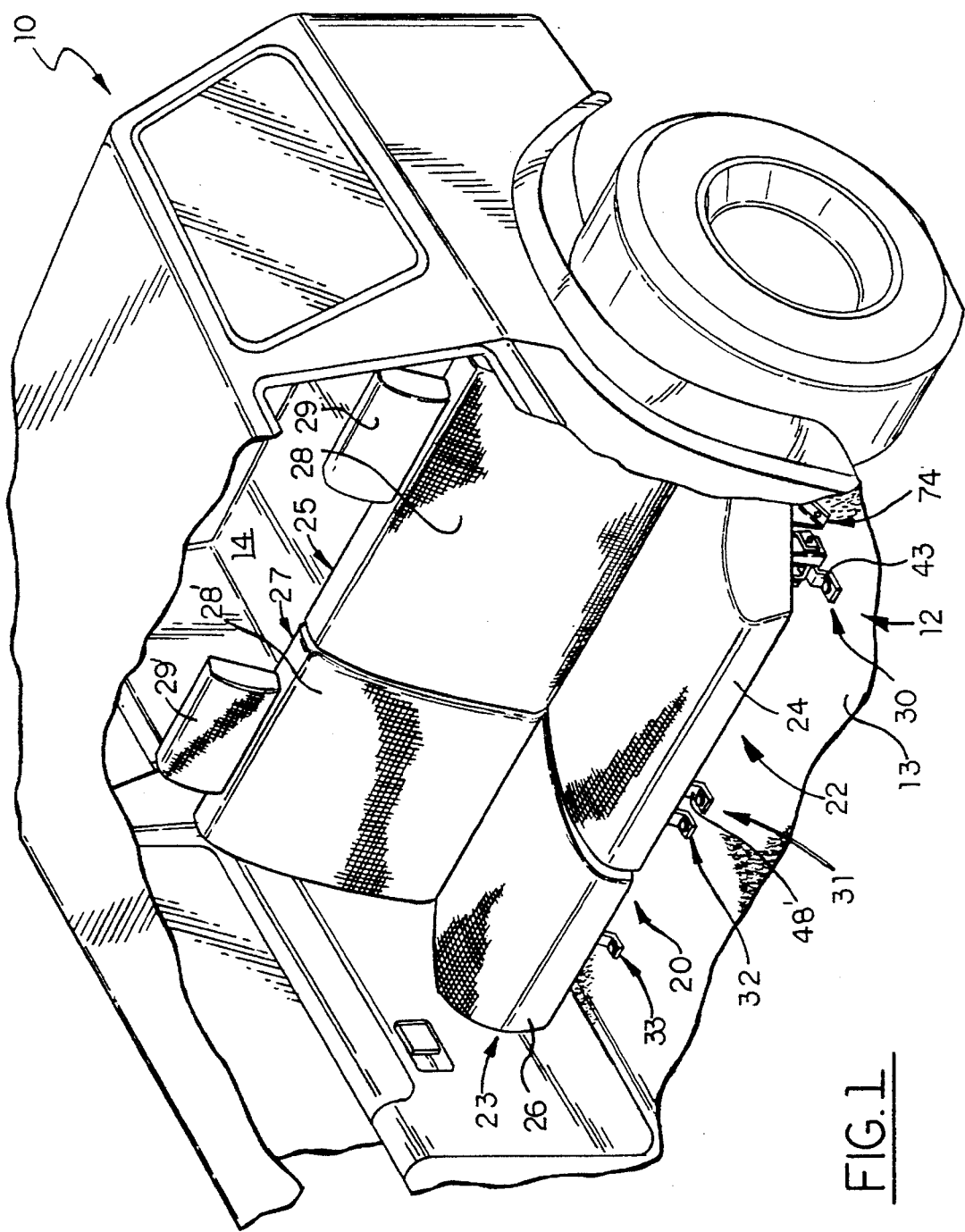
FIG. 1 is a fragmentary perspective view of a vehicle body rear passenger seat and cargo compartment showing a preferred embodiment of the rear seating system of the present invention.
Figure 2:
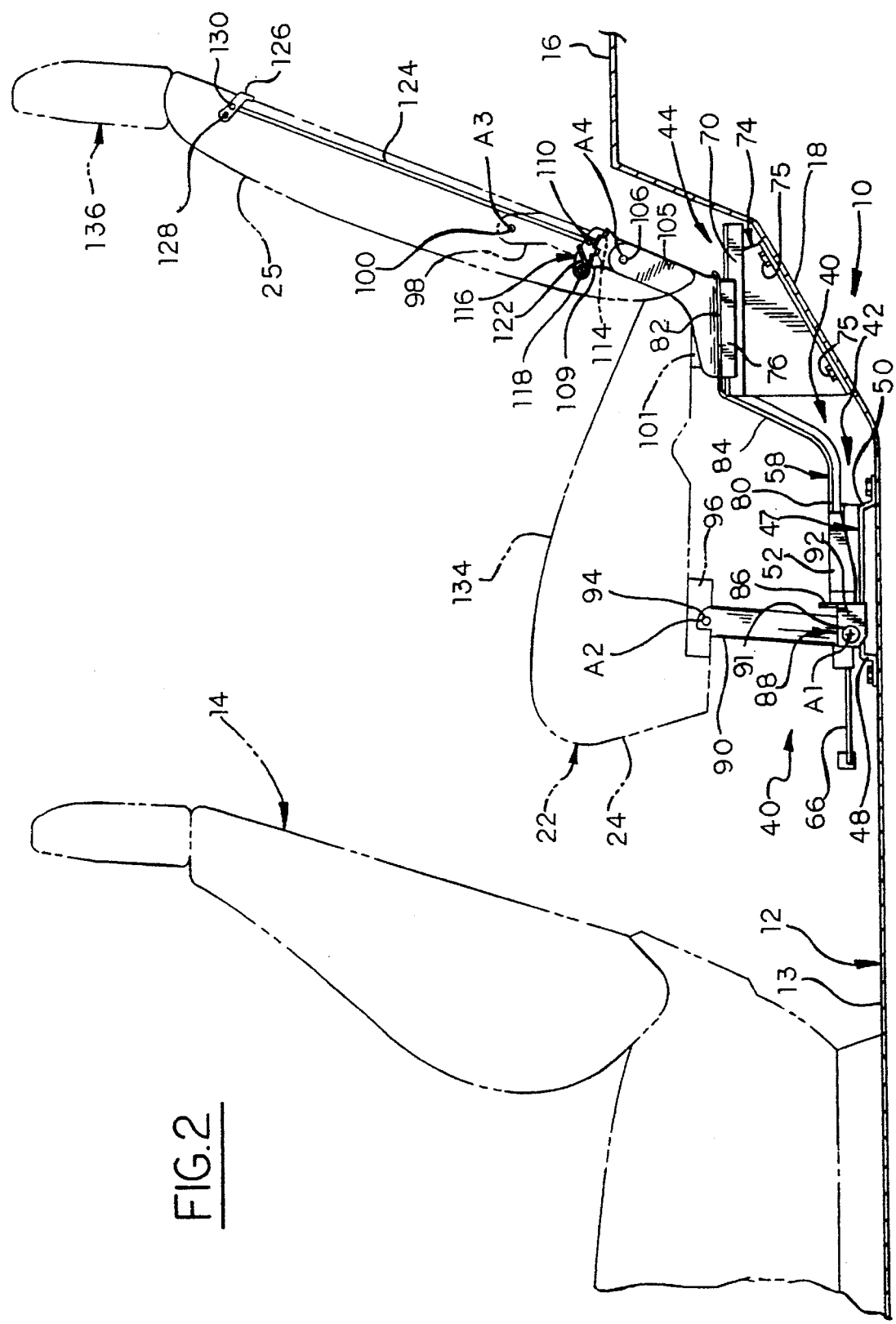
FIG. 2 is a fragmentary side view showing a vehicle front seat and the stowable rear seat at their seat design locations.

Referring now to the drawings in detail, in FIGS. 1 and 2 numeral 10 generally indicates a vehicle body which includes an underbody floor 12 having a generally flat forward portion 13 suitable for mounting a forward passenger or driver seat 14 thereon. The floor forward portion 13 terminates in an aft elevated cargo load floor 16 joined to the forward flat portion 13 by a rearwardly and upwardly sloped footwall 18.

FIG. 1 shows a vehicle rear seat, which in the disclosed embodiment is a split bench seat arrangement generally indicated at 20, including a left-hand split seat 22 and a juxtaposed right-hand split seat 23. The left-hand seat 22 includes a 60% wide seat cushion 24 and a left-hand seatback 25, while the right-hand seat 23 includes a 40% wide seat cushion 26 and a right-hand seatback 27.

It will be noted that the seatback 25 comprises a backrest member 28 and a headrest member 29. While FIG. 1 depicts the headrest member 29 as a separate element it will be understood that the present invention contemplates seatbacks wherein the backrest member 28 and the headrest member 29 are formed as one integral structure. Accordingly, in the following specification and claims the term "seatback" is intended to include both the seatback cushion 28 and the headrest cushion 29. In a like manner, "seatback" 27 includes both seatback cushion 28' and headrest cushion 29'.

With reference to FIG. 1, the left-hand seat 22 is shown mounted on the vehicle body flat floor portion 13 by an outboard dual track arrangement 30 and an inboard dual track arrangement 31. In a like manner, the right-hand seat is mounted on the flat floor portion 13 by an inboard dual-track arrangement 32 and an outboard dual-track arrangement 33. As the split seats 22 and 23 are essentially the same, except for their differences in width, only the left-hand split seat 22 will be shown and discussed in detail.

Referring to FIG. 6, numeral 40 generally indicates a bi-level seat pan frame for supporting the left-hand seat 22 on the outboard 30 and inboard 31 track arrangements. The structure of the left-hand seat 22, the seat pan frame 40, and the outboard 30 and inboard 31 dual-track arrangements are substantially symmetrical about an imaginary, longitudinally extending, medial plane of symmetry. Accordingly, the same or corresponding inboard elements of the split seat 22 will be given the same reference numerals as the outboard elements, except that such inboard reference numerals will be primed.

The track arrangements 30 and 31 each include a front floor-mounted track assembly 42, 42' and a rear riser-mounted track assembly 44, 44'. Each front track assembly 42, 42' includes a lower U-shaped stationary track member 46, 46', fixed on associated outboard 47 and inboard 47' floor brackets. The floor brackets have front 48, 48' and rear 50, 50' legs (FIG. 7) bolted to the floor portion 13. Inverted channel-shaped upper carriage tracks 52, 52' slidably engage their associated lower fixed track members 46, 46' by suitable low friction means such as, for example, a plurality of bearing balls (not shown) interposed therebetween.

As seen in FIGS. 6 and 7, a seat adjustment latching mechanism comprises outboard 54 and inboard 54' mirror image latch members each pivoted at 56, 56' respectively, to the seat pan frame 40. In the disclosed embodiment, the seat pan frame is fabricated from sheet metal, as by stamping or rolling from the sheet metal, and pan frame formed with a plurality of longitudinally extending channel-section stiffening ribs 58. The latch members 54, 54' each have a plurality of latch teeth 60, 60' adapted to extend through aligned ones of a series of longitudinally spaced openings 62, 62' in their associated lower track brackets 47 and 47'.

A tension spring 64 acts between the seat frame 40 and a central operating latch lever 66, with the lever 66 shown in FIG. 7 pivoted at a central pivot 67 to the seat frame 40. The latch members 54 and 54' are each pivotally connected to the single operating lever 66 by an associated rod 68 and 68'. The spring 64 normally biases each of the latch member teeth 60, 60' in engagement with their associated track openings 62, 62', thereby locking the seat frame 40 against longitudinal movement. Upon the operating handle 66 being pivoted against the bias of the spring 64, the latch teeth are disengaged from their associated lower track member openings, thereby permitting longitudinal fore and aft movement of the seat pan frame 40.

It will be seen in FIG. 6 that each rear outboard 44 and inboard 44' elevated track assembly has an associated lower U-shaped stationary track member 70 and 70'. Each U-shaped track member has its bight portion 71, 71' fixed to an associated aft seat riser upper web 72 and 72' of respective, outboard 74 and inboard 74' laterally spaced seat risers. FIGS. 2 and 6 show each seat riser 74, 74' fixed by associated bolts 75, 75' to the vehicle floor upwardly sloped footwall 18. Each rear track assembly 44, 44' has an associated upper channel-shaped carriage track 76, 76' which slidably engages its associated subjacent stationary track member 70, 70' in the same manner as each corresponding front track assembly 42 and 42'.

Figure 5:
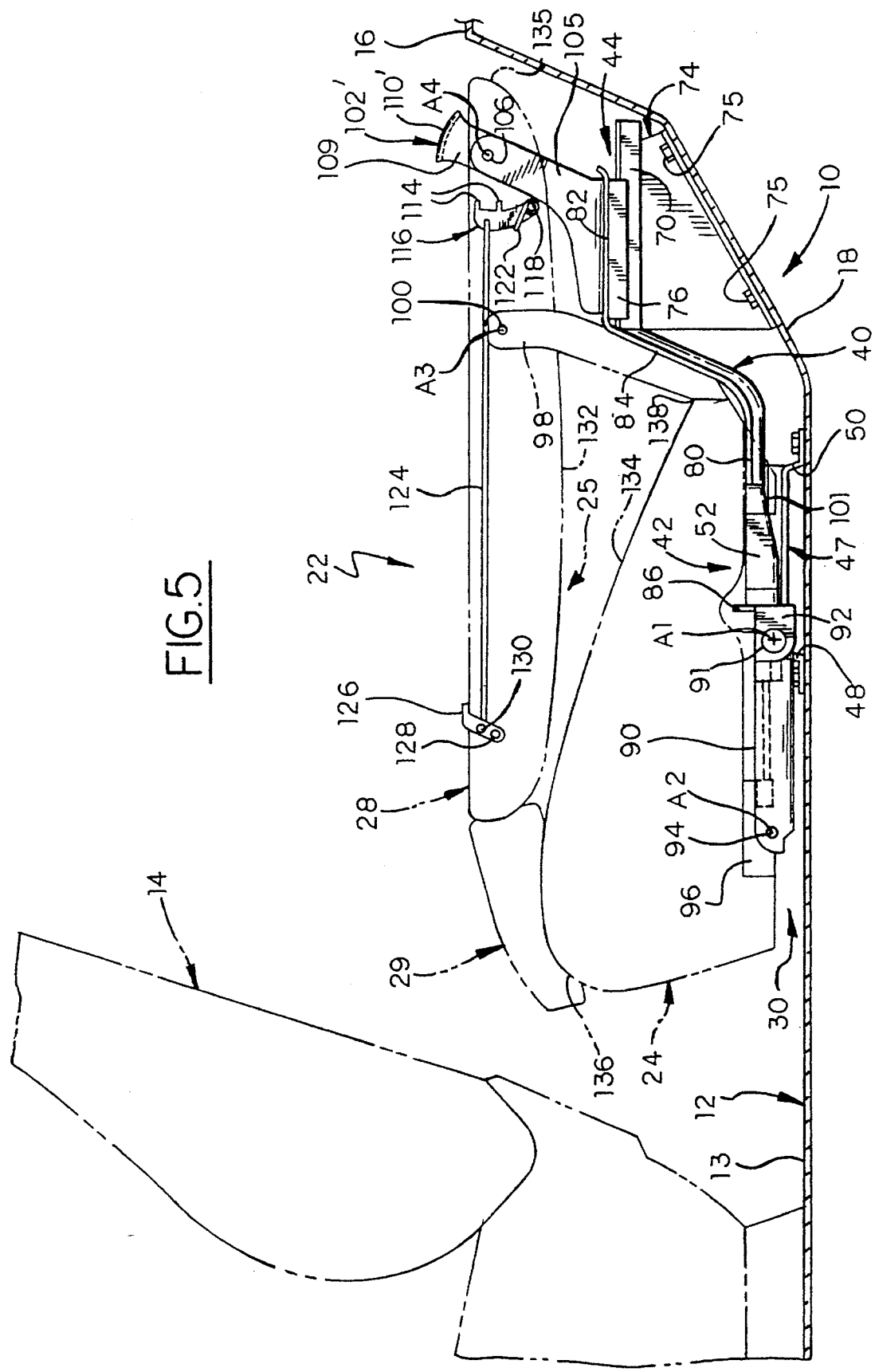
FIG. 5 is a view similar to FIG. 2 showing the seat cushion folded forwardly and downwardly adjacent the vehicle floor with the seatback folded to its full flat (110 degrees) position.

Referring to FIG. 5, it will be seen that the bi-level seat pan frame 40 has a generally double-L shape in vertical section and includes a front lower horizontally disposed portion 80 and a rear elevated horizontally disposed frame portion 82. The lower frame portion 80 is joined to the rear frame portion 82 by an upwardly and rearwardly sloped intermediate pan frame portion 84. FIG. 6 shows the pan frame 40 provided with a transverse upstanding cross-flange 86 secured, as by welding, to the front pan frame portion 80. The cross-flange 86 has its outboard and inboard ends secured to associated ear portions 87 and 87' of respective outboard 88 and inboard 88' clevis brackets. The front pan frame portion 80 is formed with outboard 89 and inboard 89' downturned flange ear portions defining, with associated ear portions 87, 87', the clevis brackets 88 and 88'.

It will be noted in FIG. 6 that the seat pan frame lower front portion 80 is fixedly secured, as by welding, to underlying channel-shaped forward track members 52 and 52'. In the same manner, the seat pan frame elevated rear portion 82 is fixedly secured to underlying channel-shaped rear tracks 76 and 76'. Accordingly, the seat pan frame 40 together with the front tracks 52, 52' and the rear tracks 76, 76' travel as a unit in a longitudinal fore and aft manner on the vehicle floor 12.

With reference to FIG. 6, it will be seen that a pair of elongated outboard 90 and inboard 90' front links are pivotally connected to pivot pins 91 and 91', respectively. The pins 91, 91' are each shown supported by an associated outboard 88 and inboard 88' clevis brackets for rotation about a first transverse pin axis "A1". Each forward link 90 and 90' has upper bifurcated ends 92 and 92' provided with holes 93 and 93', respectively, aligned on a second transverse pivot axis "A2". The aligned holes 93, 93' are pivotally connected by pivot pins 94, 94' to an associated seat cushion outboard and inboard underlying frame portion, with only the outboard link upper end pivot pin 94 and seat cushion frame portion 96 being shown in FIG. 2.

Figure 4:
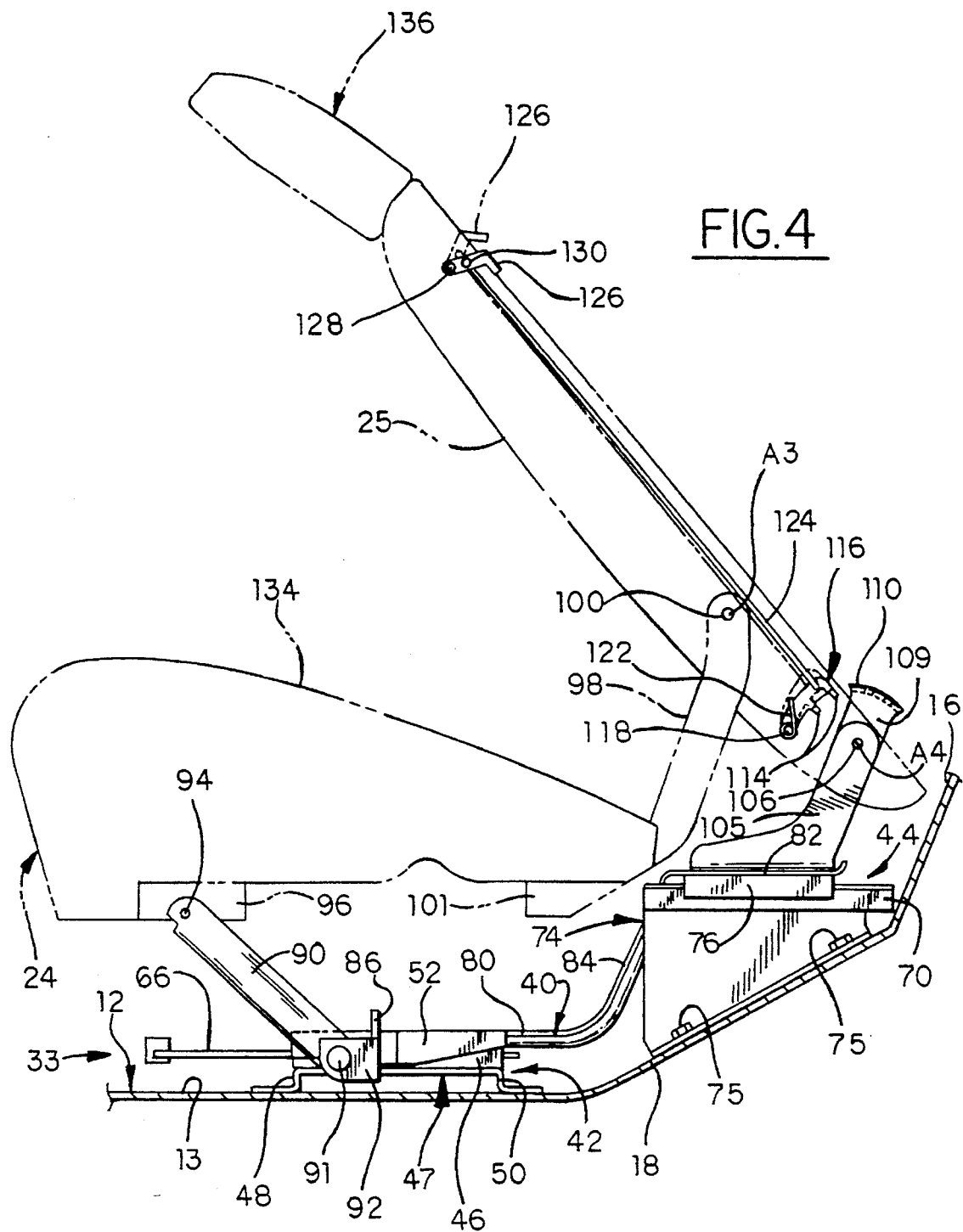
FIG. 4 is a view similar to FIG. 2 showing the rear seat in its design location with the seatback folded to its one-half (60 degrees) position.

It will be seen in FIG. 2 that the seatback 25 is connected at an intermediate pivot point, between its upper and lower ends, to a free distal end of one outboard elongated seat cushion arm 98 by a pivot pin 100 for rotational movement about a third transverse axis "A3". A second elongated inboard seat cushion arm (not shown), identical to the outboard arm 98, is provided adjacent the inboard end of the seat cushion 24. FIG. 4 depicts the upstanding outboard arm 98 having its proximate end fixedly secured, as by welding, to a seat cushion frame outboard portion 101, positioned at an aft end of the seat cushion 24.

FIG. 6 shows the elevated rear portion 80 of the seat pan frame 40 provided with outboard 102 and inboard 102' seatback L-shaped rear angle pivot mounts. Each pivot mount 102, 102' has a respective foot portion 104 and 104' fixed, as by welding, to the seat pan frame rear elevated rear portion 82. The each pivot mount 102, 102' has an upstanding plate 105, 105' connected by an associated pivot pin 106, 106' in upper aligned holes 108 and 108', respectively, to a lower end of the seatback internal frame for pivotal inclined movement of said seatback about a fourth transverse axis "A4".

Referring to FIG. 6, there is shown a distal end of the inboard pivot mount plate 105' being formed with an extended-length portion 109 terminating in a laterally extending arcuate-shaped latch flange 110. As best seen in FIG. 8, the latch flange 110 is formed with a series of radially aligned openings 112 adapted to receive a pair of longitudinally spaced fore and aft latching teeth 114 formed on the seatback latch lever 116. The seatback latch lever 116 has its one end pivotally connected to latch pivot pin 118 extending from a seat frame side wall of the seatback 27. The seatback latch lever 116 is shown biased in a counter-clockwise rotational teeth engaging direction by a wire torque spring 122.

As seen in FIG. 2, the seatback latch 116 is suitably connected, as by an elongated upstanding operating rod 124, to an operating handle 126 mounted on the seatback by a pivot 128 pin. The operating rod 124 is formed at its upper end with a right-angle pintle 130 journally received in a bore at an opposite end of the latch lever 116. The latch handle 126 is adapted to be pivoted in a counter-clockwise direction about its pin 128 to release the seat back latch lever teeth 114 from locked engagement with the arcuate flange openings 112.

Referring to FIG. 2, the vehicle seat 22 is shown in its normal design seat forming position wherein the seatback 25 is latched to the pivot plate arcuate keeper flange 110 by engaged latch lever teeth 114. The seatback 25 may be tilted forwardly toward the seat cushion 24 by pivoting operating the handle 126 upwardly to its dashed-line FIG. 4 position.

As a result, the operating rod 124 pivots the latch lever 116 about its pivot 118, thereby disengaging the latch lever teeth 114 from their associated openings 112 in arcuate keeper flange 110.

FIG. 5 depicts the seat 22 adjusted to its full forward location, wherein the seat cushion links 90, 90' have been folded to their stowed location parallel with and adjacent to the vehicle floor portion 13, by virtue of the seatback being rotated through an angle of about 110 degrees from its upright design position (FIG. 2).

It will be noted in FIG. 5 that only head rest 136 of the seatback 25 contacts a forward portion of upper support surface 134 of the seat cushion 24 in its folded flat position, wherein seatback horizontal rear surface 130 is substantially flush with the surface of the cargo load floor 16. The seatback front surface 132 is maintained in vertically spaced relation above upper support surface 134 of the seat cushion 25 by virtue of the pair of seat cushion arms 98 and side plates 105 positioning the seatback 25 in the substantially horizontal plane of FIG. 5, defined by the pivot axes "A3 and "A4", supporting the seatback 25 in a spaced manner over the seat cushion 24.

With reference to FIG. 5, it will be appreciated that the seatback headrest portion 29 is adapted to support the seatback in a vertically spaced manner above the seat cushion surface 134. As the seat cushion support surface is inclined downwardly from its forward end portion 136 to its rearward end 138, the headrest portion 29 contacts the forward end portion 136 while the backrest support surface 132 is vertically spaced above the seat cushion support surface 134.

FIG. 5 shows an aft substantially one-third portion of the seatback, from the pivot axis "A3" to the seat lower end 135, positioned in overlying spaced relation to the underlying seat riser 74 and coextensive seat frame aft track assembly 44.

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

What is claimed is:

1. A seat for a motor vehicle body comprising:

a generally horizontal seat cushion and upright seatback supported on a longitudinally adjustable bi-level seat support frame;

said seat frame comprising a front lower portion slidably mounted on front track assemblies and a rear elevated portion slidably mounted on rear track assemblies at an elevation a predetermined vertical dimension above said front track assemblies;

a bi-level frame adjustment latching device for latching said seat frame to one of said front and rear track assemblies;

a pair of forward upright links each having a lower end pivotally mounted to the seat from front portion for rotation about a first transverse axis with respect to said seat frame front portion and an upper end pivotally mounted to a front portion of said seat cushion for rotation about a second transverse axis with respect to a front portion of said seat cushion, a pair of upstanding laterally spaced arms each having a proximate end fixed to an aft end of said seat cushion and a distal end pivoted to an intermediate portion of said seatback for rotation about a third transverse axis;

a pair of upstanding seatback pivot mounts fixed on said seat frame elevated portion, each said pivot mount having an upper end pivoted to a lower portion of said seatback for seatback rotation about a fourth transverse axis, wherein said third and fourth axes define a plane common to said seatback;

a seatback pivot latching device for latching said seatback against pivotal movement;

whereby with the bi-level seat frame adjustment latching device in a locked mode and the seatback pivot latching device in an unlocked mode said seatback is adapted to be pivoted forward about said fourth axes to a fold-flat stowed position resulting in conjoint parallelogram movement of said seat cushion about said first, second, third, and fourth axes between an elevated in-use position, to a forward and lowered stowed horizontal position, wherein said seatback overlies said stowed seat cushion and said bi-level frame rear elevated portion.

2. The vehicle seat as set forth in claim 1 wherein said latching device is adapted for locking said seat frame to said bi-level seat frame adjustment, forward track assemblies in a plurality of longitudinally adjustment positions, and said pivot latching device being adapted for locking said seatback to one of said seatback pivot mounts.

3. The vehicle seat as set forth in claim 1 wherein said third and fourth axes define a plane that lies substantially within the confines of said seatback.

4. The vehicle seat as set forth in claim 1 wherein the vehicle body has a forward floor portion terminating in an elevated rear cargo floor portion located a predetermined dimension above the forward floor portion, and wherein with said seatback in its stowed position has a rear surface thereof disposed in horizontal flush relation with a surface of said elevated rear cargo load floor portion.

5. The vehicle seat as set forth in claim 4 wherein the vehicle body forward floor portion is joined to the rear cargo load floor portion by a rearwardly and upwardly sloped footwall, said footwall provided with a pair of laterally spaced seat risers with each seat riser fixedly secured to the footwall, and whereby each of the seat risers supporting an associated rear track assembly.

6. The vehicle rear seat as set forth in claim 1 wherein said bi-level seat frame is in the form of a sheet metal pan comprising a front lower portion and a rear elevated portion interconnected by a rearwardly and upwardly sloped intermediate portion.

7. The vehicle rear seat as set forth in claim 1 wherein said forward links comprise outboard and inboard laterally spaced forward links, each said link having a lower end pivoted to a clevis secured to one side of said seat frame lower portion and an upper end pivoted to a seat cushion frame member on a forward underside of said seat cushion.

8. The vehicle seat as set forth in claim 1 wherein said bi-level frame in the form of a sheet metal pan frame formed with a plurality of longitudinally extending reinforcement ribs.

9. The vehicle seat as set forth in claim 1 wherein said bi-level seat frame adjustment latching device comprises a pair of outboard and inboard latch members each pivoted to an underside of said seat frame front portion, an operating lever pivoted to an underside of said seat frame forward portion by a central pivot pin, each said latch member connected to said operating lever by a tie rod, and tension spring means connected between said seat frame forward portion and said operating lever, whereby said spring means normally locks said latch members in engagement with an associated front track assembly lower stationary track member, and whereby upon rotating said operating lever against the bias of said spring means said pair of latch members are disengaged from their associated stationary track member thereby permitting longitudinal movement of said seat support frame.

10. The vehicle seat as set forth in claim 1 wherein said seatback pivot latching device comprises a latch lever pivoted on said seatback and being adapted for locking engagement with a seatback pivot mount to prevent pivotal movement of said seatback relative to said seatback pivot mounts thereby obviating pivotal movement of said seatback.

11. The vehicle seat as set forth in claim 10 wherein said seatback pivot latching device further comprises an arcuate-shaped laterally extending flange portion formed on the upper end of one of said seatback pivot mounts.

12. The vehicle seat as set forth in claim 1 wherein said seat comprises one of a pair of vehicle rear split bench seats such that each said seat is adapted to be adjusted and stowed independently of the remaining seat.

13. The vehicle seat as set forth in claim 1 wherein said seatback comprises a backrest portion and a headrest portion, the seat cushing having a support surface, said seat cushion support surface inclining downwardly and rearwardly from a forward end portion of said seat cushion;

whereby with said seatback in its stowed position said headrest portion contacts said seat cushion support surface at the forward end portion of the seat cushion thereby positioning said backrest portion in vertically spaced overlying relation to said seat cushion support surface and said bi-level frame rear elevated portion.

\* \* \* \* \*